United States Patent
Capitan

(10) Patent No.: US 11,194,715 B2
(45) Date of Patent: Dec. 7, 2021

(54) METHOD FOR DATA COMMUNICATION, AND SYSTEM FOR IMPLEMENTING THE METHOD

(71) Applicant: ATEME, Velizy Villacoublay (FR)

(72) Inventor: Jean-Michel Capitan, Vauhallan (FR)

(73) Assignee: ATEME, Velizy Villacoublay (FR)

( * ) Notice: Subject to any disclaimer, the term of this patent is extended or adjusted under 35 U.S.C. 154(b) by 0 days.

(21) Appl. No.: 16/774,151

(22) Filed: Jan. 28, 2020

(65) Prior Publication Data

US 2020/0242028 A1    Jul. 30, 2020

(30) Foreign Application Priority Data

Jan. 28, 2019 (FR) ..................... 19 00713

(51) Int. Cl.
*G06F 12/06* (2006.01)
*G06F 13/16* (2006.01)
*G06F 13/42* (2006.01)

(52) U.S. Cl.
CPC .............. *G06F 12/06* (2013.01); *G06F 13/16* (2013.01); *G06F 13/4221* (2013.01); *G06F 2212/70* (2013.01); *G06F 2213/0026* (2013.01)

(58) Field of Classification Search
CPC ....... G06F 12/06; G06F 13/16; G06F 13/4221
See application file for complete search history.

(56) References Cited

U.S. PATENT DOCUMENTS

| | | | | |
|---|---|---|---|---|
| 7,966,355 | B2* | 6/2011 | Sherman | G06F 16/1847 707/824 |
| 8,799,521 | B2* | 8/2014 | Mullis, II | G06F 3/0667 710/5 |
| 2008/0091878 | A1* | 4/2008 | Stern | G06F 3/0643 711/115 |
| 2008/0195797 | A1* | 8/2008 | Sherman | G06F 3/0623 711/103 |

(Continued)

FOREIGN PATENT DOCUMENTS

GB       2483166 A       2/2012

OTHER PUBLICATIONS

Serial ATA International Organization, "Serial ATA International Organization: Serial ATA Revision 3.0," Gold Revision, Jun. 2, 2009, pp. 1-663.

(Continued)

*Primary Examiner* — Henry Tsai
*Assistant Examiner* — Christopher A Daley
(74) *Attorney, Agent, or Firm* — Faegre Drinker Biddle & Reath LLP

(57) ABSTRACT

A data communication method is proposed which comprises: configuring a first application interface coupled operationally to a data storage management interface, for defining a correspondence between an application data message and a memory addressing zone managed by the data storage management interface; generating a data storage command on the basis of the memory addressing zone and the application data message; and issuing, by the first (Continued)

application interface, the data storage command message to the data storage management interface for sending the application data message to a second application interface, through the data storage management interface.

20 Claims, 6 Drawing Sheets

(56) References Cited

U.S. PATENT DOCUMENTS

| 2013/0275659 | A1* | 10/2013 | Langas | G06F 3/0664 |
| | | | | 711/103 |
| 2014/0152340 | A1* | 6/2014 | Cho | G06F 13/16 |
| | | | | 326/30 |
| 2019/0052457 | A1* | 2/2019 | Connor | G06F 13/1663 |

OTHER PUBLICATIONS

Search Report issued in related application FR 1900713, dated Nov. 8, 2019, 6 pages.

\* cited by examiner

METHOD FOR DATA COMMUNICATION, AND SYSTEM FOR IMPLEMENTING THE METHOD

CROSS-REFERENCE TO RELATED APPLICATIONS

This application claims priority benefit under 35 U.S.C. § 119(d) from French Patent Application No. 19 00713, filed Jan. 28, 2019, the disclosure of which is incorporated by reference herein in its entirety.

FIELD

The present disclosure relates to a method for data communication, and also a device and a computer system for implementing this method. It applies in particular to computer systems both in the professional domain (e.g. servers, data centers, etc.) and in the mass-market domain (e.g. individual computers, personal computers, etc.).

BACKGROUND

Computers or computer servers generally have extension ports which are typically in PCI-Express format. Although very well suited to the creation of input/output or hardware acceleration modules, they have a major disadvantage of being located on the rear of machines, while the front of machines, which the user faces, is in general intended for hard drive type slots into which additional hard drives can be inserted.

This hardware architecture renders access to the extension ports difficult, in particular when the server is mounted in a rack, which considerably restricts its use.

The goal of the present disclosure is to at least partially correct the aforementioned drawbacks.

SUMMARY

According to a first aspect, a data communication method is proposed comprising: configuring a first application interface operationally coupled to a data storage management interface, for defining a correspondence between an application data message and an accessible memory addressing zone (addressed) (managed) by the data storage management interface; generating a data storage command on the basis of the memory addressing zone and the application data message; and issuing, by the first application interface, the data storage command message to the data storage management interface for sending the application data message to a second application interface, through the data storage management interface.

Advantageously, the proposed method makes it possible to use any extension port for the use of an additional hard drive located in front of a computer or a computer server for connecting to it an application module, such as for example a data processing module, and thus implementing on the computer or the server a corresponding application (such as for example an application for encrypting/and decrypting a video stream). For example, a SATA type extension port can be used for connecting to it a module of another kind than a data storage module for which the SATA port is initially intended, and to do this transparently for the SATA controller installed on the machine, that is without it being necessary to provide a specific software interface for this SATA controller.

An advantage of the proposed method thus lies in the fact that it is based on the standard SATA layers of the host operating system software (computer or server on which one or more SATA interfaces are configured), without it being necessary to modify the driver or the lower layers, nor to generate a specific driver. The use of the proposed method is thus completely transparent to the host.

The features proposed in the following paragraphs can, optionally be implemented. They can be implemented independently of each other or in combination with each other:

In one or more embodiments, the data storage command message can be a data write request corresponding to the application data message in the addressing zone.

In one or more embodiments, the application data message can be encapsulated in the data written into the addressing zone.

In one or more embodiments, the proposed method can further comprise: configuring a second application interface in order to define the correspondence between an application data message and the memory addressing zone managed by the data storage management interface; receiving, from the data storage management interface, a data storage command message; and obtaining, on the basis of the memory addressing zone and the data storage command message, the application data message coming from a first application interface.

In one or more embodiments, the data storage command message can be a data read request corresponding to the application data message in the addressing zone.

In one or more embodiments, the application data message can be encapsulated in data read in the addressing zone.

Advantageously, the method can be implemented such that any encapsulation is done at the "application" level making the method usable on all machines having one or more data storage locations conforming to the SATA interface standard.

According to another aspect, a device is proposed, which comprises a second application interface unit comprising a data communication interface operationally coupled to a processor, wherein the processor is configured for implementing one or more embodiments of the proposed method, whenever the second application interface unit is coupled to a data storage management interface of a computer system.

In one or more embodiments of the device, the second application interface unit is configured for exchanging data with a first application interface configured for being implemented by a computer system processor, whenever the second application interface unit is coupled to the data storage management interface of the information system, where the first and second application interface units form respectively the first and second application interfaces of the data storage management interface.

In one or more embodiments, the device further comprises an application unit operationally coupled to the second application interface unit, and configured for implementing an application for processing data received from the second application interface unit for processing.

In one or more embodiments of the proposed device, the application unit is configured for processing the video stream received from the second application interface unit, where the processing relates to one or more among compression, decompression, encoding, decoding, encryption and decryption.

Another aspect relates to the application interface unit, configured for implementing, whenever the application interface unit is implemented by a computer system processor, a data communication method according to one of the embodiments proposed in the present patent application.

Another aspect relates to a computer program, loadable in a memory associated with a processor, and comprising code segments for implementing a method such as proposed in the present application during execution of said program by the processor.

Another aspect relates to a set of data representing, for example by way of compression or encoding, a computer program such as proposed in the present application.

Another aspect relates to a nonvolatile storage medium for a computer executable program comprising a set of data representing one or more programs, where said one or more programs comprise instructions for driving the computer to manage a device during execution of said one or more programs by a computer comprising a processor operationally coupled to a memory and to a data communication input/output interface according to a data communication method according to one of the embodiments proposed in the present application.

Another aspect relates to a nonvolatile storage medium for a computer executable program comprising a set of data representing one or more programs, where said one or more programs comprise instructions for driving the computer to manage a device during execution of said one or more programs by a computer comprising a processing unit operationally coupled to memory means and to an input/output interface, driving the computer to implement a data communication method according to one of the embodiments proposed in the present application.

BRIEF DESCRIPTION OF THE DRAWINGS

Other specifics and advantages of the present disclosure will appear in the following description of non-limiting implementation examples, referring to the attached drawings in which.

DETAILED DESCRIPTION

Figure 1A:
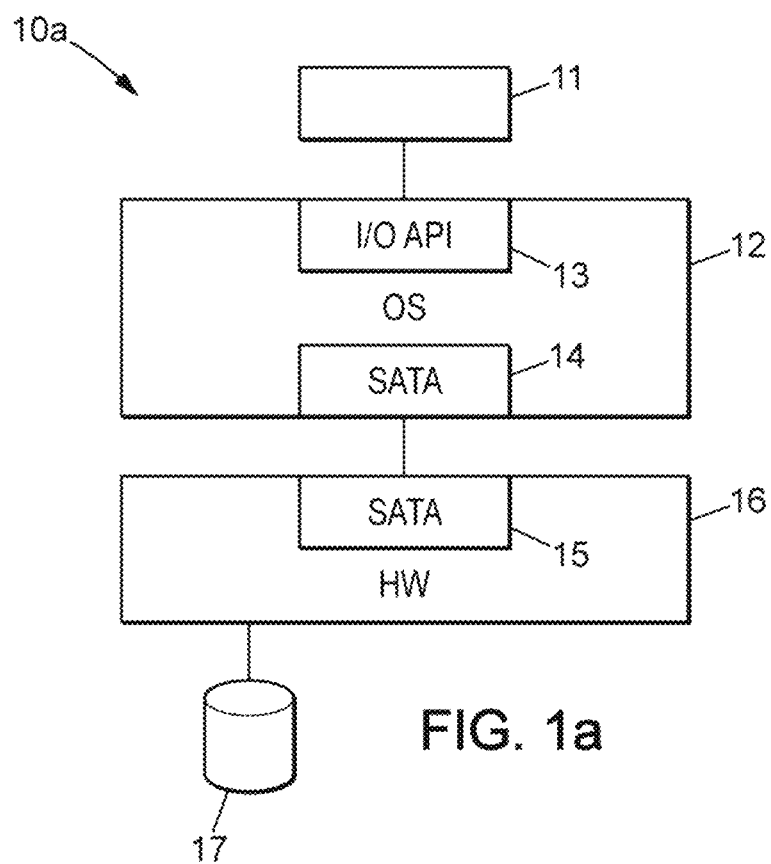
FIG. 1a is a drawing showing a sample data storage system using a SATA controller.

In the following detailed description of embodiments of the disclosure, many specific details are presented to provide a more complete understanding. Just the same, the person skilled in the art is able to recognize that embodiments can be practiced without these specific details. In other cases, well-known features are not described in detail to avoid unnecessarily complicating the present description.

The present application refers to functions, motors, units, modules, platforms and illustrations from diagrams of methods and devices according to one or more embodiments. Each of the functions, motors, modules, platforms, units and diagrams described can be implemented in hardware, software (including in the form of embedded software ("firmware"), or "middleware"), microcode or any combination thereof. In the case of an implementation in software form, the functions, motors, units, modules and/or illustrations from diagrams can be implemented by computer program instructions or software code, which can be stored or sent on a computer-readable medium, including a nonvolatile medium, or a medium loaded in memory of a generic or specific computer, or any other programmable apparatus or device for data processing in order to produce a machine, such that the computer program instructions or software code executed on the data processing programmable computer or apparatus or device constitute means for implementing these functions.

The embodiments for a computer-readable medium include, without being exhaustive, computer storage media and communications media, including any medium making it easier to transfer a computer program from one place to another. "Computer storage medium/media" is understood to mean any physical medium accessible by computer. Examples of computer storage media include, without limitation, drives or flash memory components or any other flash memory device (for example USB keys, memory keys, memory sticks, disk-keys), CD-ROM or other optical data storage devices, DVD, magnetic disk data storage or other magnetic data storage devices, data memory components, RAM, ROM, EPROM memory, memory cards ("smartcards"), SSD ("Solid-State Drive") type memory, and any other form of medium usable for transporting or storing or recording data or data structures which can be read by a computer processor.

Further, various forms of computer-readable media can transmit or carry instructions to a computer, such as a router, gateway, server, or any data transmission equipment whether it involves wire transmission (by coaxial cable, fiber optics, telephone wires, DSL cable or Ethernet cable), wireless (for example infrared, radio, cellular, microwave), or virtualized transmission equipment (virtual router, virtual gateway, virtual tunnel end, virtual firewall). The instructions can, depending on the embodiments, comprise code in any computer programming language or computer program element, such as, without limitation, assembly languages, C, C++, Visual Basic, Hypertext Markup Language (HTML), Extensible Markup Language (XML), Hypertext Transfer Protocol (HTTP), Hypertext Preprocessor (PHP), SQL, MySQL, Java, JavaScript, JavaScript Object Notation (JSON), Python and Bash scripting.

Further, the terms "in particular," "for example," "sample," "typically" are used in the present description for designating examples or illustrations of non-limiting embodiments which do not necessarily correspond to embodiments that are preferred or advantageous over other possible aspects or embodiments.

"Server" or "platform" is understood in the present application to mean any service point (virtualized or not) or device operating data processing, one or more databases, and/or data communication functions. For example, and without limitation, the term "server" or the term "platform" can refer to a physical processor operationally coupled with communication functions, databases and associated data storage, or refer to a network, group, assembly or complex of processors and data storage equipment and associated networks, and also an operating system and one or several database systems and application software supporting services and functions provided by the server. The computer device can be configured for sending and receiving signals, by wired or wireless transmission network(s), or configured for processing and/or storing data or signals, and can therefore operate as a server. In that way, equipment configured for operating as a server can include, as nonlimiting examples, rack-mounted dedicated servers, office computers, portable computers, service gateways (sometimes called "box" or "residential gateway"), multimedia decoders (sometimes called "set-top boxes"), integrated equipment combining various functionalities, such as two or more functionalities mentioned above. The servers can vary greatly in their configuration or their capacities, but a server will generally include one or more central processing unit(s) and memory. The server can also include individual or multiple mass memory equipment, one or more electrical supply(s), one or more wired or wireless network interface(s), one or more input/output interface(s), one or more operating system(s), such as Windows Server, Mac OSx, UNIX, Linux, FreeBSD, or an equivalent.

The terms "network" and "communication network" such as used in the present application refer to one or more data links which can couple or connect equipment, which could be virtualized, so as to allow transport of electronic data between computer systems and/or modules and/or other devices or electronic equipment, such as a server and a client device, or other types of devices, including between wireless devices coupled or connected by a wireless network, for example. A network can also include mass memory for storing data such as NAS ("network attached storage"), and SAN ("storage area network"), or any other form of medium readable by a computer or by a machine, for example. A network can comprise, in whole or part, the Internet, one or more local networks ("local area network," or LAN), one or more WAN type networks ("wide area networks"), wired connections, wireless connections, cellular, or any other combinations of these various networks. Similarly, subnetworks can use different architectures or be compliant or compatible with various protocols, and interoperate with larger size networks. Various types of equipment can be used to make various architectures or various protocols interoperable. For example, a router can be used to provide a communication link or a data link between two LANs which would otherwise be separated and independent.

The terms "operationally coupled," "coupled," "mounted," "connected," and various variants and forms thereof used in the present refer to couplings, connections, mountings, which can be direct or indirect, and comprise in particular connections between electronic equipment or between portions of such equipment which allows operating and functioning such as described in the present application. Further the terms "connected" and "coupled" are not limited to physical or mechanical connections or couplings. For example, an operational coupling can include one or more wired connection(s) and/or one or more wireless connection (s) between two or more equipment units which allow simplex and/or duplex communication links between the equipment or portions of the equipment. According to another example, an operational coupling or connection can include coupling by a wired and/or wireless link in order to allow data communication between a server of the proposed system and other equipment of the system.

FIG. 1a illustrates a sample data storage system (10a) using a SATA ("Serial Advanced Technology Attachment"). The SATA controller is used on computers for connecting data storage peripherals (e.g. mechanical hard drive, SSD, DVD player, etc.), via a SATA type data storage management interface specified by the Serial ATA International Organization.

For a detailed description of the SATA specifications, one can refer to the technical specification "Serial ATA Revision 3.4 Specification" published in June 2018. The person skilled in the art will however understand that the methods, systems and devices proposed in the present description are not limited to a specific version of the SATA specification, nor even to a SATA type data storage management interface, but can be implemented with any type of data storage management interface.

The system (10a) shown in FIG. 1a comprises an application software unit (11) coupled by a data communication link (which can be implemented in software or hardware form or as a combination of software and hardware) to an operating system unit (12) (OS, for "Operating System"), via an application programming interface (13) (API, for "Application Programming Interface") configured for providing a file input/output interface for the communication of data between the application software unit (11) and the operating system unit (12).

The operating system unit (12) is configured for controlling SATA interface driving software (14) ("SATA Driver"), which is configured for driving a SATA type hardware controller (15) among other material elements of the system (10a), for example integrated on a computer motherboard (16). The SATA interface driver software (14) can be configured for being executed on the SATA type hardware controller (15) and/or any process or assembly of processors with which the motherboard (16) is equipped.

A data storage unit (17), such as for example a hard drive (e.g. mechanical hard drive, SSD, etc.), is connected to the motherboard (16) to be driven by the SATA controller (15), which is configured for controlling the actions performed on the data storage unit (17) (e.g. writing, reading, and deleting data on the data storage unit). The connection between the data storage unit (17) and the motherboard (16) can use a cable equipped with hardware connectors conforming to the SATA specifications.

Figure 1B:
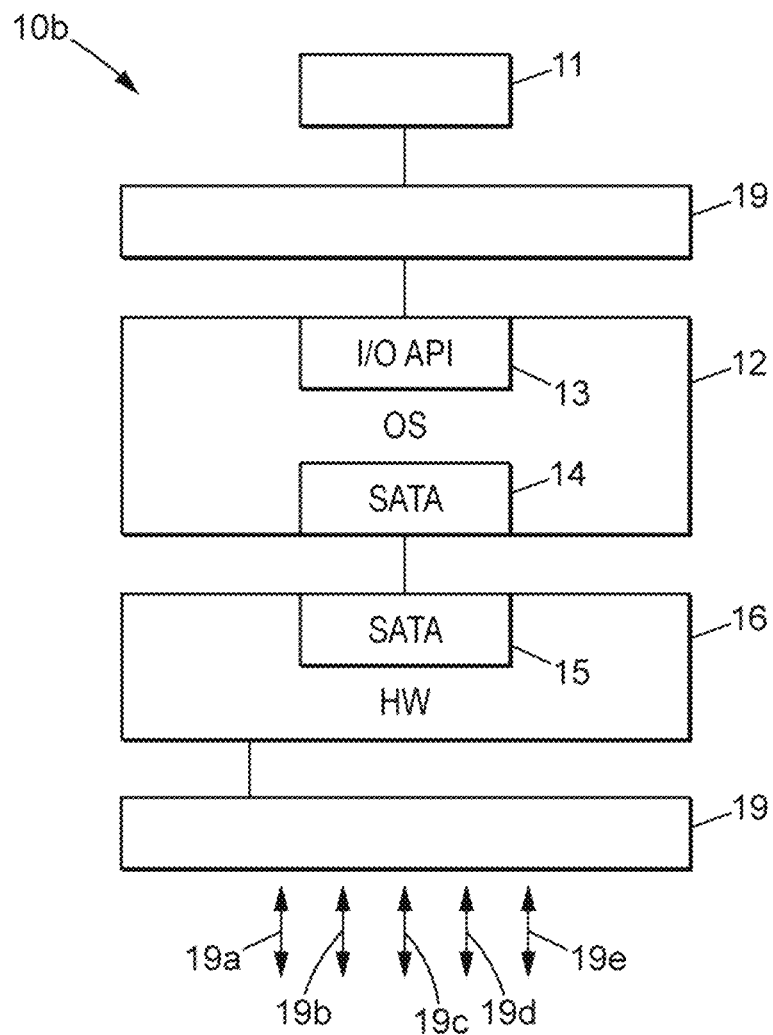
FIG. 1b is a drawing showing a sample system according to one or more embodiments.

FIG. 1b is a drawing showing one or more embodiments in which a system (1b) comprises, in addition to the application software unit (11), the operating system unit (12), the application programming interface (13), the SATA interface driver software (14), the SATA controller (15), and the motherboard (16) shown in FIG. 1a, a data transcoding unit (18) and in emulation unit (19), which could comprise one or more input/output interfaces (19a, 19b, 19c, 19d, 19e).

The emulation unit (19) is configured, in one or more embodiments, for emulating, from the perspective of the interface thereof with the SATA controller (15), a data storage unit, such as the unit (17) shown in FIG. 1a. Thus, the SATA controller (15) "sees" a data storage unit via the interface thereof with the emulation unit and handles the set of data coming from or going to the emulation unit (19) as if it involved a data storage unit.

The data transcoding unit (18) is configured, in one or more embodiments, to transform the data coming from and/or originating in the application software unit (11) in order for it to be processed transparently by the SATA interface driver software (14) and the SATA controller (15).

In one or more embodiments, the data transcoding unit (18) can be configured for transforming the data by encapsulation/de-encapsulation, so as to encapsulate data coming from the application software unit (11) into messages conforming to the SATA specification, and/or the encapsulating data from the application programming interface (13) coming from the SATA interface driver software (14) in order to extract them from the messages complying with the SATA specifications.

With the proposed systems and methods, a location on the front of a computer intended for receiving a data storage unit (such as, for example, a hard drive) can thus advantageously be used for an application other than data storage, and can do so completely transparently for the SATA hardware controller and the SATA software driver configured for managing a data storage unit installed in (or, as applicable, on) the location.

Data communication methods in a system such as the one shown in FIG. 1b are described below in one or more embodiments.

Figure 2A:
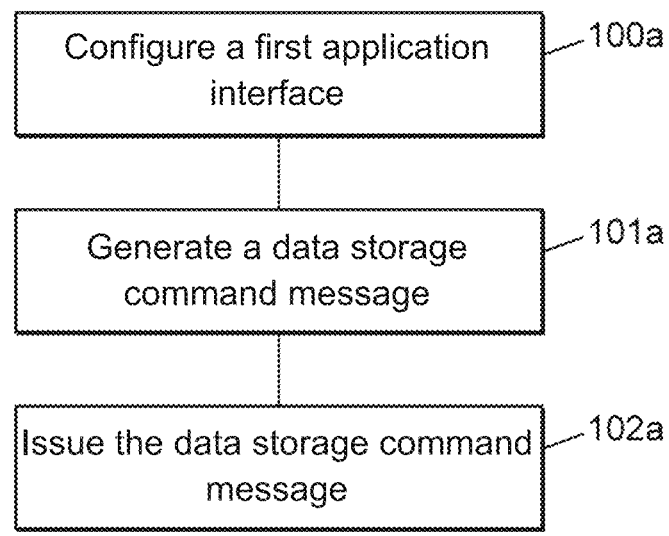
FIG. 2a is a diagram showing a method according to one or more embodiments.

With reference to FIG. 2a, the configuration (100a) of a first application interface comprises the definition of at least one correspondence between an application data message and a memory addressing zone accessible by a data storage management interface.

In one or more embodiments, a correspondence table between application data messages and memory addressing zones defined in a virtual memory addressable by the data storage management unit (for example by a SATA interface comprising a software driver and a controller) can be pre-configured and stored in a memory of the first application interface.

With reference to FIG. 1b, in one or more embodiments, the first application interface can correspond to the data transcoding unit (18), and the data storage management interface can correspond to a SATA interface, comprising a hardware part which corresponds to a SATA controller (15), and the software part which corresponds to a SATA interface driver software (14).

Once the correspondence is defined between an application data message and a memory addressing zone accessible by a data storage management interface, a data storage command message is generated (101a) on the basis of the memory addressing zone and the application data message.

The data storage command message is then sent (102a), by the first application interface, to the data storage management interface, in order to send the application data message through the data storage management interface to a second application interface.

In one or more embodiments, the first and second application interfaces can be configured in order to be used respectively on opposite sides of the data storage management interface. For example, in the embodiments in which the data storage management interface is SATA type, the first application interface can be configured for being used as a SATA driver software interface, whereas the second application interface can be configured for being used as an interface for the SATA hardware controller.

In one or more embodiments, the data storage command message can correspond to a request to write data in the memory addressing zone, where the data correspond to the application data message.

In one or more embodiments, the application data message is encapsulated in the data storage command message, such that the data for the application data message are inserted in the usable data (e.g. "payload") of the data storage command message.

Figure 2B:
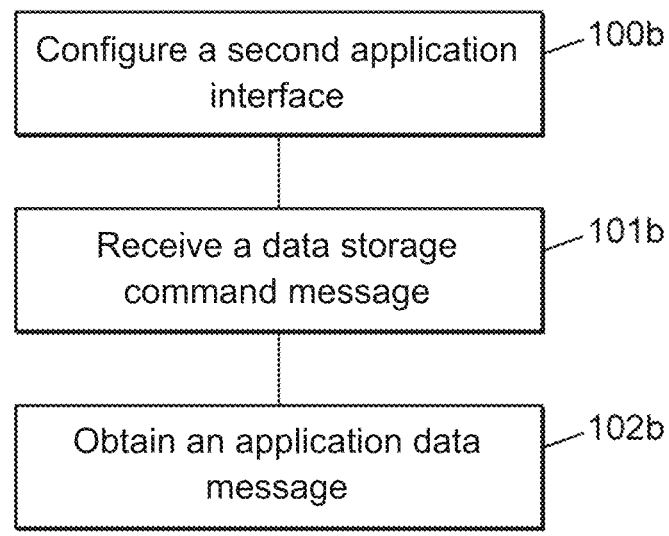
FIG. 2b is a diagram showing a method according to one or more embodiments.

With reference to FIG. 2b, the configuration (100b) of a second application interface comprises the definition of at least one correspondence between an application data message and a memory addressing zone accessible by a data storage management interface.

In one or more embodiments, a correspondence table between application data messages and memory addressing zones defined in a virtual memory addressable by the data storage management unit (for example by a SATA interface comprising a software driver and a controller) can be pre-configured and stored in a memory of the second application interface.

With reference to FIG. 1b, in one or more embodiments, the second application interface can correspond to the emulation unit (19), and the data storage management interface can correspond to a SATA interface, comprising a hardware part which corresponds to a SATA controller (15), and a software part which corresponds to a SATA interface driver software (14).

Once a correspondence is defined between an application data message and a memory addressing zone accessible by a data storage management interface, a data storage command message is received (101b) from the data storage management interface.

The application data message, coming from a first application interface, is then obtained (102b) at the second application interface on the basis of the memory addressing zone and the data storage command message.

Again, the first and second application interfaces can be configured in order to be used respectively on both sides of the data storage management interface. For example, in the embodiments in which the data storage management interface is SATA type, the first application interface can be configured for being used as a SATA driver software interface, whereas the second application interface can be configured for being used as an interface for the SATA hardware controller.

Figure 3A:
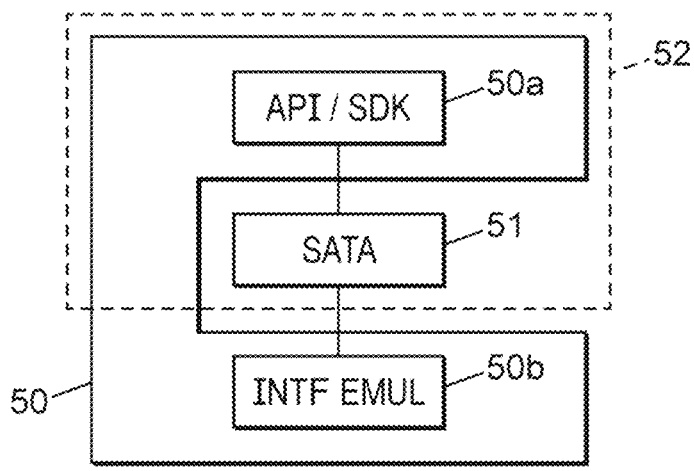
FIG. 3a is a diagram showing a system for implementation of the proposed method according to one or more embodiments.

FIG. 3a is a diagram showing a system (50) for implementation of the proposed method according to one or more embodiments.

The shown system (50) comprises a first application interface unit (50a) and a second application interface unit (50b), configured to be used on either side of the SATA types data storage management unit (51), as shown in FIG. 3a. The SATA type data storage management unit (51) typically comprises a SATA controller and a SATA driver, not shown in the figure, and forms a data storage management interface. The first unit (50a) thus forms a first application interface operationally coupled to the SATA type data storage management unit (51), for example to the SATA driver, whereas the second unit (50b) forms a second application interface operationally coupled to the SATA type data storage management unit (51), for example to the SATA controller.

Depending on the selected embodiments, the first and second application interface units can each be implemented in software form, in which case the application interface unit takes the form of a program executable by a processor, or in hardware form, as an application-specific integrated circuit (ASIC), or system-on-a-chip (SOC), or in form of a combination of hardware and software elements, such as for example software intended to be loaded and executed on an FPGA (Field Programmable Gate Array) type component. The SOC (System-on-a-Chip) are embedded systems which integrate components of an electronic system in a single chip. An application interface unit can also use hybrid architectures, such as for example architectures based on a CPU+FPGA, a GPU (Graphics Processing Unit) or an MPPA (Multipurpose Processor Array).

For example, in one or more embodiments, the first application interface unit (50a) can be implemented in the form of software configured for being executed by one or more processors, such as for example a computer processor (52) (typically a server) on which the first application interface unit (50a) and SATA type data storage management unit (51) are implemented. In this scenario, the first application interface unit (50a) can comprise one or more software development libraries (for example in the form of an SDK ("Software Development Kit")) configured for a given application, and also a software interface (for example in the form of an application programming interface (API)), it too configured for the intended application so as to provide a data communication interface with a software application corresponding to this intended application. The first application interface unit (50a) can thus correspond to software configured for implementing the method proposed in the present description as it relates to the first interface. In particular, the first application interface unit (50a) can comprise software configured for encapsulating messages and/or application data in the specified messages in order to be used with the SATA type data storage management unit (51), and the de-encapsulation of encapsulated application messages or data in messages specified for being used with the SATA type data storage management unit (51).

For example, in one or more embodiments, the second application interface unit (50b) can be implemented in the form of a combination of hardware and software comprising an FPGA component and a processor, configured for implementing the method proposed in the present description as it relates to the second interface. In particular, the second application interface unit (50b) can comprise a combination of hardware and software configured to emulate a data storage medium, in order to exchange data transparently with the first application interface unit (50a) of the SATA type data storage management unit (51). The second application interface unit (50b) can therefore comprise, in one or more embodiments, a hardware interface (and in particular a connector) complying with the SATA specifications in order to be physically connected to the SATA type data storage management unit (51) in the same way as a data storage medium complying with the SATA specifications would be.

One of the advantages of the proposed system lies in the fact that it can be used on any computer type or information system provided with a SATA type data storage management interface, which is the case of the very large majority of existing computer systems. In particular, the proposed methods and systems do not require developing an interface specific to the SATA driver used by the computer system on which they are used, because they use or include an application interface operationally coupled to the SATA interface, and in particular to the SATA driver configured on the SATA interface. The proposed systems are therefore advantageously transposable and reusable on any computer machine comprising a SATA interface (typically comprising a SATA hardware layer and a SATA software layer).

Figure 3B:
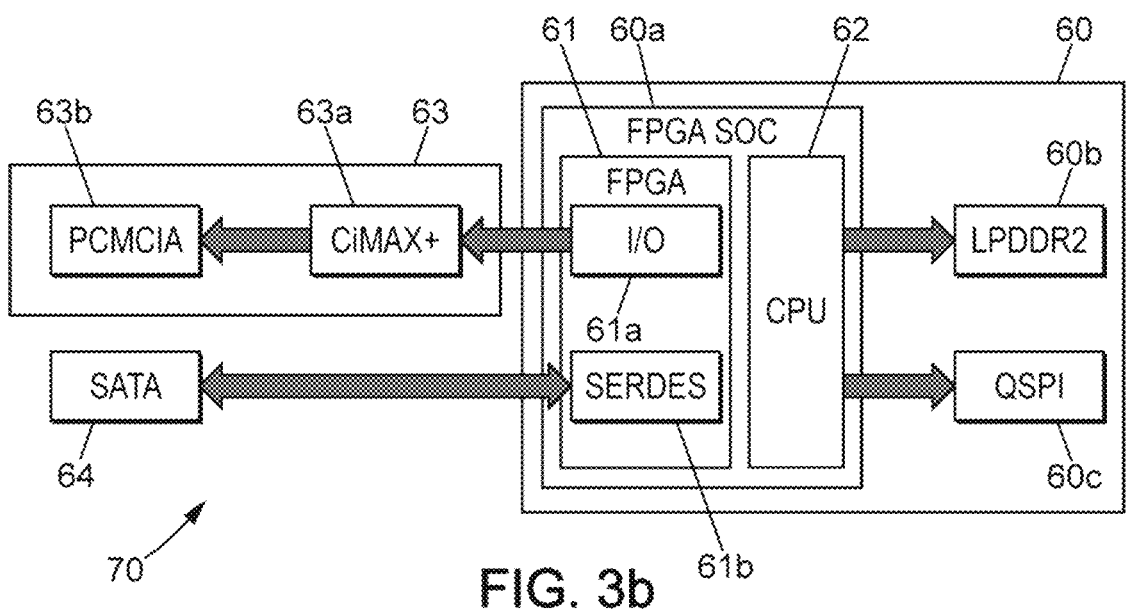
FIG. 3b is a diagram showing a system for implementation of the proposed method according to one or more embodiments.

FIG. 3b is a diagram showing a sample embodiment of a system (70) configured for implementing the proposed method in the non-limiting context of a video stream processing application. The system shown in FIG. 3b comprises a device (60) which can correspond in one or more embodiments to the emulation unit (19) shown in FIG. 1b, or to the second application interface unit (50b) shown in FIG. 3a.

In this context, the application message(s) transmitted between the first (50a) and second (15b) application interfaces can include video stream processing messages. The non-limiting example of video stream encrypting/decrypting type video stream processing is described below.

In fact, the proposed method advantageously makes it possible to implement a decrypting module for compressed and encrypted video streams ("Transport Stream," or "TS"), via the use of Content Access Modules ("CAM"), for example in PCMCIA format in which chip cards are inserted. Such CAM modules are commonly used in content distribution or content broadcast fields, for example for decrypting video streams encrypted and sent by satellite, such that it is particularly advantageous to be able to use SATA locations located on the front surface of video servers for inserting therein CAM modules configured for decrypting received video streams by using information provided by the chip card inserted in each module.

Each SATA location on a server is configured for being driven by a SATA controller, which can be implemented in hardware form, software form or in a software and hardware combination form. Some servers corresponding to one rack unit (1U or 1RU) can comprise up to eight front surface SATA locations. Chip cards are nearly impossible for a user to use if they are located on the rear surface of 1RU server once it is mounted in a rack of servers. Further, it can be advantageous to use several CAM modules in a single video stream processing server and the proposed method then allows using several SATA locations, or even all the SATA locations, located on the front surface of the 1RU server for video stream decrypting in parallel.

The non-limiting embodiment of the device (60) shown in FIG. 3B is based on the use of an FPGA SOC type programmable component (60a), comprising an FPGA core (61) and a central processing unit (62) (or "CPU") comprising one or more processors. The device (60) illustrated further comprises one or more memories (60b, 60c), for example serial flash memory type (60a) (for example "Quad Serial Peripheral Interface" or "QSPI"), and/or dynamic memory type (60b) (for example "Low-Power Double Data Rate 2" or "LPDDR2").

In one or more embodiments, the FPGA core (61) can comprise an input/output module (61a) equipped for coupling of the device (60) with a CAM module (63), and also a high-speed data communication interface module (61b) for example serial transceivers type (Serializer/Deserializer transceiver, or "SerDes Transceiver"), coupled to a SATA compatible connector (64). In one or more embodiments, the FPGA core (61) can thus be configured for managing the SATA and CAM data interfaces, for example in the form of the process described in a hardware description language (for example VHDL type ("VHSIC Hardware Description Language," where VHSIC is the acronym for "Very High-Speed Integrated Circuits")).

The central processing unit (62) can be configured to encapsulate and de-encapsulate the data payloads and command/signaling data, in connection with the interfaces (61a, 61b) managed by the FPGA core (61).

In FIG. 3a, the CAM module (63) is configured for implementing a CAM standard interface by means of a PCMCIA connector (63b) intended for putting a chip card in it, and a "CiMax+" decryption module (63a).

In one or more embodiments, the device (60) can be configured for being used as an application interface unit for implementation of the proposed method, by being connected to a computer system SATA port by means of the connector (64), and also to a CAM module (63) in order to supply the video stream encryption and decryption application.

The device (60) can further advantageously be arranged for having sizes and shape corresponding to a SATA location located on the front surface of a computer system, so as to use the SATA location as an additional data storage module for which the SATA location is intended would do. For example, the device (60) can be configured for complying with the hardware specifications for a SATA location intended for a front-surface expansion hard drive, including when a chip card is inserted in the CAM module (63) through the PCMCIA slot (63b).

As explained above, the device (60) can advantageously be configured for emulating a data storage module, and interoperating with the SATA interface with which it is connected transparently for the SATA controller and driver of this interface.

Depending on the selected application (in the example shown in FIG. 3a, the video stream encryption/decryption), the computer system will be configured with an application software layer corresponding to this application, and in particular with an application interface unit configured for implementing, within the computer system, the method proposed for the chosen application.

Figure 3C:
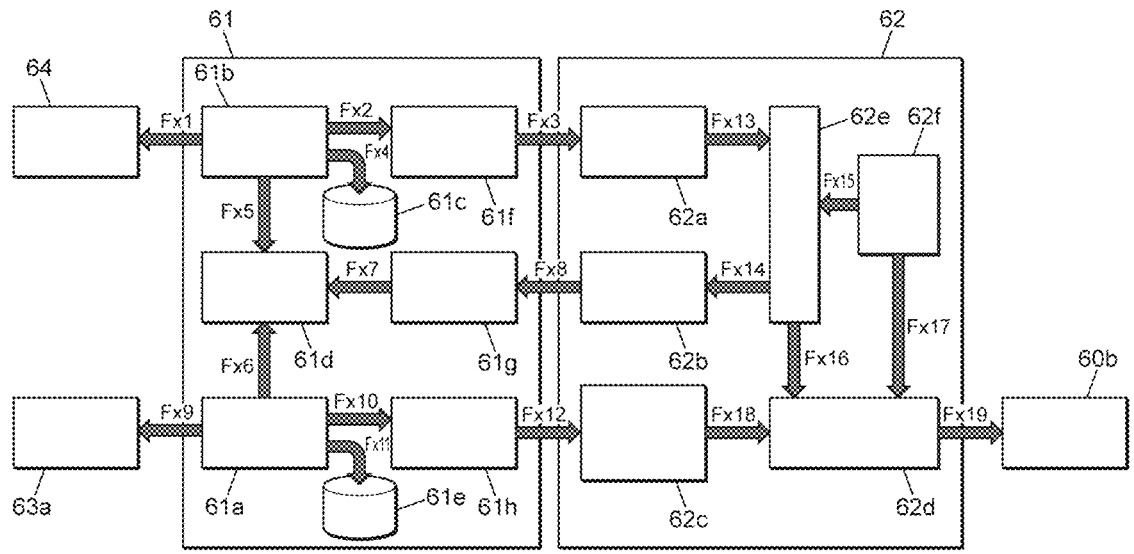
FIG. 3c is a diagram showing a data streams implemented on the system from FIG. 3b according to one or more embodiments.

In the context of a decryption application, the main data flow relates to the video stream data packets to be decrypted via the decryption module (63a) of the CAM module (63). FIG. 3c shows data flows implemented on the system (70) from the FIG. 3b.

With reference to FIG. 3c, the data Fx1 sent from the SATA controller (61b) to the SATA connector (64) passes over a SATA type bidirectional bus (transceiver-TX/RX). The SATA controller (61b) further has access (Fx5) to registers (61d), to which the CAM controller (61a) also has access (Fx6). The data flow Fx2 is sent by the transport layer of the SATA protocol and passes over a master FPGA interface bus (610 in order to be transmitted (Fx3) to a junction module (62a) between the FPGA (61) and the CPU (62). The FPGA (61) further comprises one or more buffer memories (61c, 61e), accessible from the SATA controller (61b), and from the CAM controller (61a), respectively, by respective SRAM memory interface buses (for example double ported) (Fx4, Fx11). The layer 3 (transport) interconnection entity (62e) is configured for receiving data (Fx13) from the junction module (62a) between the FPGA (61) and the CPU (62) which passes over an interconnection bus for data transport between the FPGA and the SDRAM controller or the processor (620, and providing data (Fx14) which passes over an interconnection bus for the transfer of data between the FPGA and the processor (620 to the junction module (62c) between the CPU (62) and the FPGA (61) which passes to the registers (61d) of the FPGA (61) via the bus (Fx7) by means of an FPGA slave bus and master CPU (Fx8).

The data (Fx9) transmitted from the CAM controller (61a) towards the decryption (CIMAX+) module (63a) passes over a bidirectional data bus (for example 8 bit) for TS video stream transfer (MPEG Transport Stream) towards the CAM. The CAM controller (61a) additionally has access (Fx6) to registers (61d), as indicated above, and also to a buffer memory (61e) for storing video stream data (Fx11) therein. The video stream data are sent by the CAM controller to the FPGA (data stream Fx10) on an interface bus between the TS stream storage buffer and the master bus (61h) in order to be sent (Fx12) to a junction module (62e) between the FPGA (61) and the CPU (62).

The SDRAM memory controller receives data (Fx16) from the layer 3 (transport) interconnection entity (62e), from (Fx18) the junction module (62c) between the FPGA (61) and the CPU (62), and from (Fx17) the processor (620. The processor (620 is further coupled to the junction modules (62a, 62e) by means (Fx15) of the layer 3 (transport) interconnection entity (62e), and can store data (Fx19) in memory (60b) (for example, SDRAM LPDDR2 type) which pass over and SDRAM LPDDR2 memory interface bus.

Figure 4:
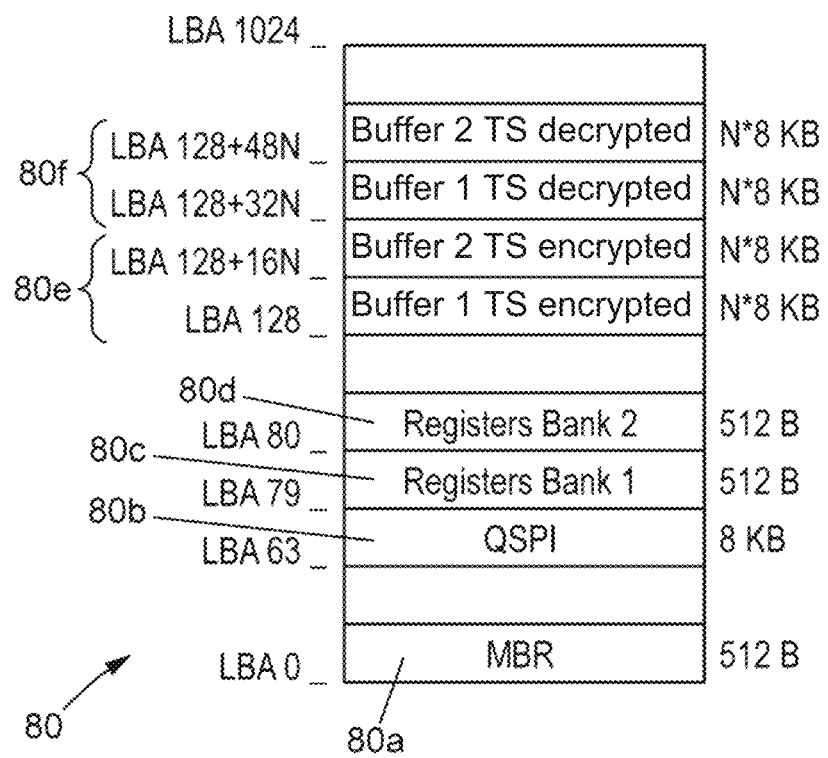
FIG. 4 shows an example of virtual memory according to one or more embodiments of the proposed method.

As described above, the device (60) can be configured for emulating a data storage drive interface conforming to the SATA specifications. FIG. 4 shows an example of virtual memory according to one or more embodiments of the proposed method.

The virtual drive (80) emulated by the device (60) can for example have a 512 MB capacity, and be divided into functional regions (on the basis of Logical Block Addressing ("LBA")) as shown in FIG. 4. In one or more embodiments, this virtual drive (80) can be used for defining respective correspondences between application messages and space addressable by a SATA controller of a SATA interface. Thus, application messages can be mapped onto respective zones of a virtual memory, each corresponding to a SATA storage space. Data about the emulated drive (size, unformatted disk (without partition)) are entered in the Master Boot Record (80a) located at the address LBA 0.

In one or more embodiments, an address space (or an address zone) (80b) of the virtual drive can be reserved in order to correspond to a memory space (8 kB size in the example shown in the Figure), for example in the QSPI Flash memory (60c) of the device (60) from FIG. 3b, in which the software updates are stored, in particular for the software used by the FPGA core.

In one or more embodiments, another address zone (80c) of the virtual drive can be reserved in order to correspond to a memory space (512 B size in the example shown), for example in the LPDDR2 memory (60b) of the device (60) from the FIG. 3b, in which the general status registers are stored, in particular relating to the software and/or hardware versions used, to the CAM module, etc.

In one or more embodiments, another address zone (80d) of the virtual drive can be reserved in order to correspond to a memory space (512 B size in the example shown), for example in the LPDDR2 memory (60b) of the device (60) from the FIG. 3b, in which status registers for the buffer memory zones are stored and in which encrypted and decrypted video stream data are stored.

In one or more embodiments, another address zone (80e) of the virtual drive can be reserved in order to correspond to a memory space (NX8 kB size in the example shown, where N is an integer greater than or equal to 1), corresponding to one or more memory buffers, for example in the LPDDR2 memory (60b) of the device (60) from the FIG. 3b, in which encrypted video stream data are stored.

In one or more embodiments, another address zone (80f) of the virtual drive can be reserved in order to correspond to a memory space (NX8 kB size in the example shown, where N is an integer greater than or equal to 1), corresponding to one or more memory buffers, for example in the LPDDR2 memory (60b) of the device (60) from the FIG. 3b, in which decrypted video stream data are stored.

Figure 5:
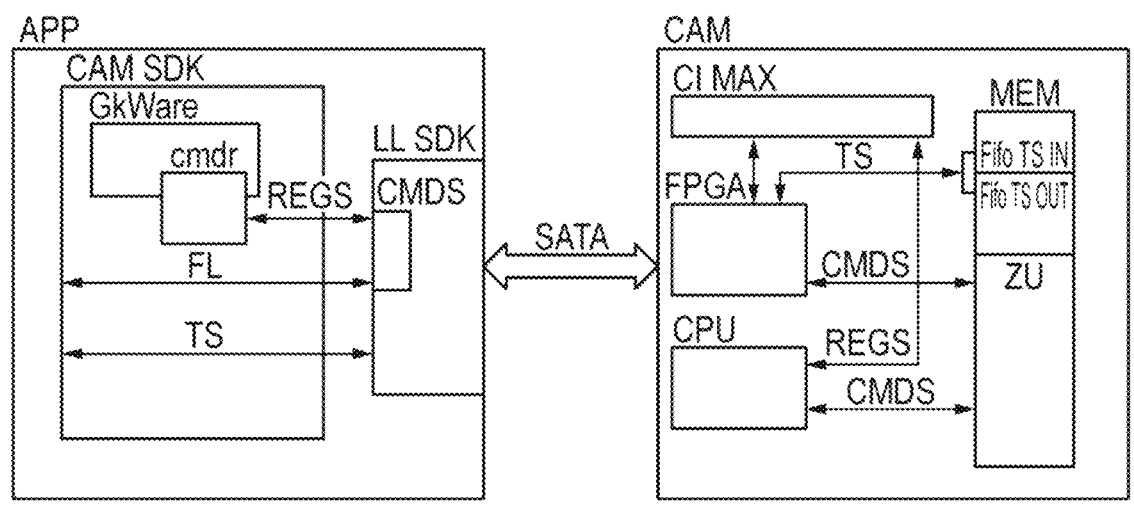
FIG. 5 is a diagram showing a sample software architecture according to one or more embodiments method.

FIG. 5 is a diagram showing a sample software architecture of a system configured for implementing the proposed method in the non-limiting context of a video stream processing application.

Referring to FIG. 5, the CAM entity is configured for emulating a memory drive. Further, in one or more embodiments, it is configured in order to interface with an operating system (for example, Linux) over a SATA bus. The FPGA component is configured for processing the SATA protocol management and routing of data in various modules according to the target logical block address (LBA) indicated in the transfer. The software executed by the central processing unit (CPU) is configured for interpreting and executing commands sent by the low-level software (LL SDK).

At the level of the application entity (APP), the low-level software (LL SDK) is configured in order to format the access to be sent to the FPGA, for sending the corresponding SATA commands, and interpreting the responses received. It relies on the "SCSI Generic (SG)" driver for generating the accesses. This driver provides a low-level access (LBA) to the hard drives.

With the GkWare CI Stack software library, the use of the CiMAX decrypting component can be abstracted.

The CAM SDK software development library is a high level interface uniformly exposing all the functions of the system.

The software interface between the low-level software (LL SDK) and the SATA entity is configured to provide the following functions (commands): WriteLba (LBA Index, Buffer, Size) and ReadLba (LBA Index, Buffer, Size).

The block (for example 512 bytes) is the minimum size of an access. Depending on the LBA index specified and the direction of the access, the command will be interpreted five different ways, described in the following table:

TABLE 1

| LBA | WRITE | READ |
| --- | --- | --- |
| 8388607 2097155 | Write TS_IN FIFO | Read TS_OUT FIFO |
| 2097154 2 | User write zone | User read zone |
|  | Direct mapping LBA/SDRAM Address (2097152 * 512 = 1 GB) | |
| 1 | CPU command | Command result |
| 0 | N/A | N/A |

The CPU commands used are generated by writing to a predefined LBA address (for example LBA 1). In one or more embodiments, they have a maximum size (for example 512 bytes), and can be at most two types. Direct type: the command is executed and no result is necessary (a "write" command is sufficient), and indirect type: the command is executed and a read is necessary to retrieve the result ("write" command followed by a "read" command are necessary).

The format of the command is described by the following table, in one or more embodiments:

TABLE 2

| Index | 32 bits | Incremented with each command |
| --- | --- | --- |
| Command Id | 32 bits | Command identifier |
| Data | 0-504 bytes | — |

In one or more embodiments, the list of commands can be that described in the following table:

TABLE 3

| Command | Mnemonic | Id | Type |
| --- | --- | --- | --- |
| Write registers | REG_WR | 0x00 | Direct |
| Flash read | FLASH_RD | 0x01 | Direct |
| Flash write | FLASH_WR | 0x02 | Direct |
| Read registers | REG_RD | 0x04 | Indirect |
| Read status | STATUS_RD | 0x05 | Indirect |

In one or more embodiments, a (direct) command to write register(s) can have the following format:

TABLE 4

| Num | 32 bits | Number of registers to write |
| --- | --- | --- |
| Register offset | 32 bits | |
| Data | 32 bits | |

In one or more embodiments, a (direct) command to read data from flash memory (FL) can have the following format:

TABLE 5

| Flash source address | 32 bits | |
| --- | --- | --- |
| SDRAM destination address | 32 bits | |
| Size | 32 bits | in bytes |

In one or more embodiments, a (direct) command to write data in flash memory (FL) can have the following format:

TABLE 6

| Flash destination address | 32 bits | |
| --- | --- | --- |
| SDRAM source address | 32 bits | |
| Size | 32 bits | in bytes |

In one or more embodiments, a (indirect) command to read register(s) (REGS) can have the following format:

TABLE 7

| Num | 32 bits | Number of registers to read |
| --- | --- | --- |
| Register offset | 32 bits | |
| Data | 32 bits | |

In one or more embodiments, a (indirect) command to read status can have the following format:

TABLE 8

| FPGA version | 32 bits | |
| --- | --- | --- |
| CPU version | 32 bits | |
| Serial number | 96 bits | xxxx-xxxxx |
| State of the flash | 32 bits | Busy/Idle |
| Current flash transfer size | 32 bits | in bytes |
| Current flash transfer position | 32 bits | in bytes |
| Log available | 32 bits | Boolean |
| TS_OUT FIFO level | 32 bits | in bytes |
| Flash destination address | 32 bits | |
| SDRAM source address | 32 bits | |
| Size | 32 bits | in bytes |

The software interface between the processing entity (CPU) and the FPGA is configured to provide the following functions (commands) (FIFO_IN):

TABLE 9

| FIFO_IN_ADDRESS | 32 bits | Base address |
| --- | --- | --- |
| FIFO_IN_SIZE | 32 bits | Size in bytes |
| FIFO_IN_WR_INDEX | 32 bits | Write index in bytes (maintained by the CPU) |
| FIFO_IN_RD_INDEX | 32 bits | Read index in bytes (maintained by the FPGA) |
| FIFO_IN_ENABLE | 32 bits | Allow data transfer to the CI MAX |
| FIFO_IN_RESET | 32 bits | Reset WR_INDEX and RD_INDEX counters to 0. |

And also the following functions (FIFO_OUT):

TABLE 10

| | | |
|---|---|---|
| FIFO_OUT_ADDRESS | 32 bits | Base address |
| FIFO_OUT_SIZE | 32 bits | Size in bytes |
| FIFO_OUT_WR_INDEX | 32 bits | Write index in bytes (maintained by the FPGA) |
| FIFO_OUT_RD_INDEX | 32 bits | Read index in bytes (maintained by the CPU) |
| FIFO_OUT_ENABLE | 32 bits | Allow data transfer from the CI MAX |
| FIFO_OUT_RESET | 32 bits | Reset WR_INDEX and RD_INDEX counters to 0. |

In one or more embodiments, the memory mapping is configured with the FIFO stack input zone (FIFO In), for example 64 MB in size, a FIFO stack output zone (FIFO Out), for example 64 MB in size, and a user zone (ZU), for example 1 GB in size.

In one or more embodiments, the flash memory (FL) mapping is configured by a boot program loader, a serial number, a boot operation, verification operations ("checksum"), FPGA recovery code, CPU recovery code, code for execution by the FPGA component and code for execution by the CPU.

In one or more embodiments, a test software can be provided in order to allow implementing one or more SDK library functions: Memory transfer: Read user memory (address, size), write into a file, and read from a file, right into memory (address). Flash transfer: Read flash (address, size), write into a file, Read from a file, write into the flash (address), Decrypt a TS file (Read from the file, extract payload (PMT, descriptors), Configuration of the module, Streaming of the file, Retrieval of the decrypted file, Storing in a file), Access to the menus (Consultation, Navigation).

In one or more embodiments, the operating modes for video stream (TS) data transfer can be defined as follows: (1) Send encrypted TS (HOST to TS_IN FIFO): The HOST writes in the LBA range corresponding to the FIFO. The processor (CPU) programs the receiving of data to the address FIFO_IN_ADDRESS+FIFO_IN_WRINDEX. Once the transfer is finished, the CPU updates the FIFO_IN_WR_INDEX register. (2) Send encrypted TS (TS_IN FIFO to CiMAX): So long as the FIFO_IN_WR_INDEX and FIFO_IN_RD_INDEX registers are different, the FPGA sends the data contained between the two pointers to the CiMAX. It updates the FIFO_IN_RD_INDEX register. (3) Receiving decrypted TS (CiMAX to TS_OUT FIFO): The FPGA receives the data coming from the CiMAX. It transfers them to the address FIFO OUT FIFO OUT ADDRESS+ FIFO_OUT_WRINDEX. (4) Receiving decrypted TS (TS_OUT FIFO to HOST): The HOST periodically sends STATUS_RD commands. The CPU updates the field "TS_OUT FIFO level" in the response by doing the FIFO_OUT_WR_INDEX_FIFO_OUT_RD_INDEX operation. The HOST does a read in the LBA range corresponding to the FIFO of size less than or equal to the FIFO level. The CPU programs Once the transfer is finished, the CPU updates the FIFO_OUT_RD_INDEX register.

In one or more embodiments, the operating modes for transfers to and from Flash memory can be defined as follows: (1) Send data into the flash memory: The HOST writes in the LBA range corresponding to the user zone. The CPU programs the receiving of data to the designated address. The HOST sends a FLASH WR command by using the SDRAM address from the previous transfer as source. The CPU updates the fields relating to the flash in the status command and starts the transfer. The HOST periodically sends STATUS_RD commands until the "State of the flash" field returns to "Idle." (2) Read data from the flash memory: The HOST sends FLASH_RD command by using an SDRAM address from the users zone as a destination. The CPU updates the fields relating to the flash in the status command and starts the transfer. The HOST periodically sends STATUS_RD commands until the "State of the flash" field changes to "Idle." The HOST writes in the LBA range corresponding to the SDRAM address from the preceding transfer.

In one or more embodiments, the (CiMAX) module for video stream (TS) decryption can be configured as follows: The access registers necessary for the configuration of the CiMAX can be generated by the GkWare CI Stack library. When this library needs to access the CiMAX component, it calls callbacks containing the list of access registers to do. For the write registers: The HOST sends a REG WR command. The CPU does the access over the SPI bus. For the read registers: The HOST sends a REG_RD command. The CPU does the access over the SPI bus. The host sends an LBA 1 read command. The CPU returns the results.

Depending on the chosen embodiment, some steps, actions, events or functions of each of the methods described in the present document can be done or can occur in a different order from the one in which they were described or can be added, merged or else not done or not happen, according to the case. Further, in some embodiments, some steps, actions or events are done or happen concurrently and not successively.

Although described through some number of detailed implementation examples, the proposed method and the device for implementation of an embodiment of the method comprise various variants, modifications and improvements which will appear as obvious to the person skilled in the art, with it understood that these various variants, modifications or improvements are part of the scope of the disclosure, such as defined by the following claims. Further, various aspects and features described above can be implemented together, or separately, or else substituted for each other, and the set of the various combinations and sub-combinations of aspects and features are part of the scope of the disclosure. Further, it is possible that some systems and equipment described above do not incorporate all of the modules and functions described for the preferred embodiments.

The invention claimed is:

1. A method for data communication, comprising:
receiving, at a first application interface operationally coupled to a data storage management interface, an application data message, wherein the first application interface is configured with a correspondence between the application data message and an accessible memory addressing zone managed by the data storage management interface;
generating a first data storage command message on the basis of the memory addressing zone and the application data message; and
issuing, by the first application interface, the first data storage command message to the data storage management interface for sending the application data message to a second application interface, through the data storage management interface, wherein the second application interface is configured with a correspondence between the application data message and the accessible memory addressing zone managed by the data storage management interface;

receiving, at the second application interface, from the data storage management interface, a second data storage command message; and obtaining, on the basis of the memory addressing zone and the second data storage command message, the application data message;

wherein the first application interface is configured for transcoding received data, and wherein the second application interface is configured for emulating a data storage unit operable with the data storage management interface.

2. The method according to claim 1 wherein the first data storage command message is a data write request corresponding to the application data message in the addressing zone.

3. The method according to claim 1 wherein the application data message is encapsulated in data written into the addressing zone.

4. The method according to claim 1 wherein the second data storage command message is a data read request corresponding to the application data message in the addressing zone.

5. A device, comprising a second application interface unit comprising a data communication interface operationally coupled to a processor of the device, wherein the second application interface unit is configured for, whenever the device is coupled to a data storage management interface of a computer system, implementing the second application interface of the method according to claim 1.

6. The device according to claim 5, further comprising a first application interface unit comprising a data communication interface operationally coupled to the processor, wherein the first application interface unit is configured for being implemented by a computer system processor, whenever the device is coupled to the data storage management interface of the computer system, implementing the first application interface of a method for data communication for performing the steps comprising:

receiving, at a first application interface operationally coupled to a data storage management interface, an application data message, wherein the first application interface is configured with a correspondence between the application data message and an accessible memory addressing zone managed by the data storage management interface;

generating a first data storage command message on the basis of the memory addressing zone and the application data message; and issuing, by the first application interface, the first data storage command message to the data storage management interface for sending the application data message to a second application interface, through the data storage management interface, wherein the second application interface is configured with a correspondence between the application data message and the accessible memory addressing zone managed by the data storage management interface;

receiving, at the second application interface, from the data storage management interface, a second data storage command message; and obtaining, on the basis of the memory addressing zone and the second data storage command message, the application data message;

wherein the first application interface is configured for transcoding received data, and wherein the second application interface is configured for emulating a data storage unit operable with the data storage management interface.

7. The device according to claim 5 further comprising an application unit operationally coupled to the second application interface unit, and configured for implementing an application for processing data received from the second application interface unit for processing.

8. The device according to claim 7 wherein the application unit is configured for processing a video stream received from the second application interface unit, where the processing relates to one or more among compression, decompression, encoding, decoding, encryption and decryption.

9. The device according to claim 8, wherein the application unit is further configured for coupling of the device with a Content Access Module (CAM) configured for processing the video stream received from the second application interface unit.

10. The device according to claim 6, further configured to be inserted in an extension slot located on a front panel of a computer server, wherein the extension slot is configured for coupling a data storage unit operable with the data storage management interface.

11. The device according to claim 6, wherein the data storage management interface comprises a Serial Advance Technology Attachment (SATA) interface.

12. An application interface unit, configured for implementing, whenever the application interface unit is implemented by a computer system processor, the method according to claim 1.

13. The method according to claim 1, wherein the data storage management interface comprises a Serial Advance Technology Attachment (SATA) interface.

14. The method according to claim 1 further comprising: at an application unit operationally coupled to the second application interface, processing data received from the second application interface.

15. The method according to claim 14, wherein the processing data comprises: processing a video stream received from the second application interface, where the processing relates to one or more among compression, decompression, encoding, decoding, encryption and decryption.

16. The method according to claim 15, wherein the application unit is further configured for coupling of the device with a Content Access Module (CAM) configured for processing the video stream received from the second application interface unit.

17. A nonvolatile storage medium for a computer executable program comprising a set of data representing one or more programs, wherein said one or more programs comprise instructions for, during execution of said one or more programs by a computer comprising a processing unit operationally coupled to a memory and to an input/output interface, driving the computer to implement the method for data communication, comprising:

receiving, at a first application interface operationally coupled to a data storage management interface, an application data message from an application unit, wherein the first application interface is configured with a correspondence between the application data message and an accessible memory addressing zone managed by the data storage management interface;

generating a first data storage command message on the basis of the memory addressing zone and the application data message; and issuing, by the first application interface, the first data storage command message to the data storage management interface for sending the application data message to a second application interface, through the data storage management interface, wherein the second application interface is configured with a correspondence between the application data message and the accessible memory addressing zone managed by the data storage management interface;

the method further comprising:

receiving, at the second application interface, from the data storage management interface, a second data storage command message; and obtaining, on the basis of the memory addressing zone and the second data storage command message, the application data message;

wherein the first application interface is configured for transcoding data received from the application unit, and wherein the second application interface is configured for emulating a data storage unit operable with the data storage management interface.

18. The nonvolatile medium according to claim 17, wherein the first data storage command message is a data write request corresponding to the application data message in the addressing zone.

19. The nonvolatile medium according to claim 17, wherein the application data message is encapsulated in data written into the addressing zone.

20. The nonvolatile medium according to claim 17, wherein the second data storage command message is a data read request corresponding to the application data message in the addressing zone.

\* \* \* \* \*